Feb. 18, 1958 R. A. HENSON 2,823,878
REVERSE THRUST LANDING CONTROL FOR AIRCRAFT
Filed March 11, 1955 2 Sheets-Sheet 2
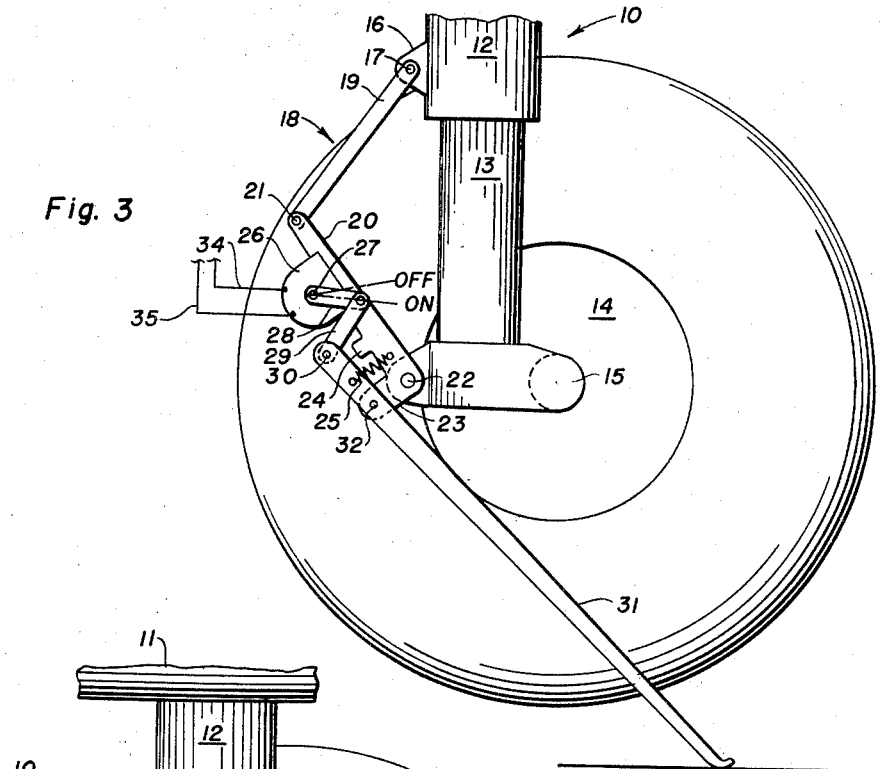
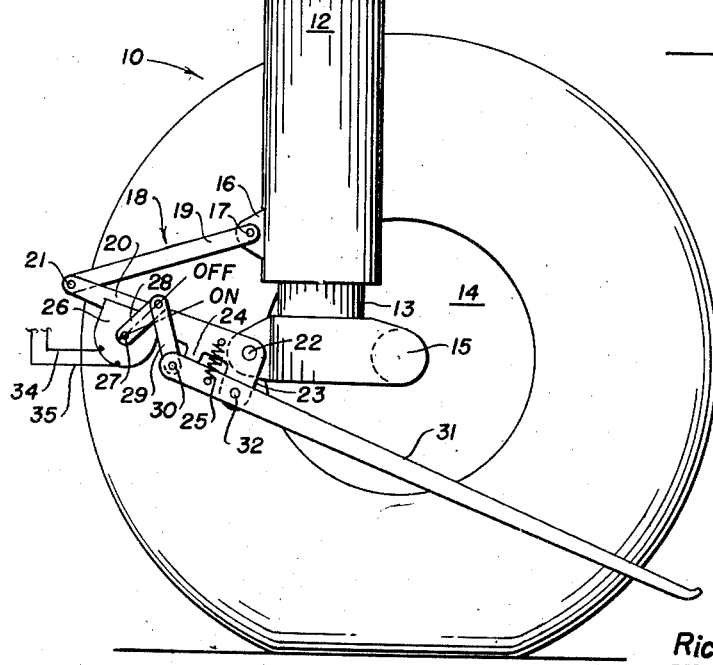
INVENTOR.
Richard A. Henson
BY
ATTORNEY.

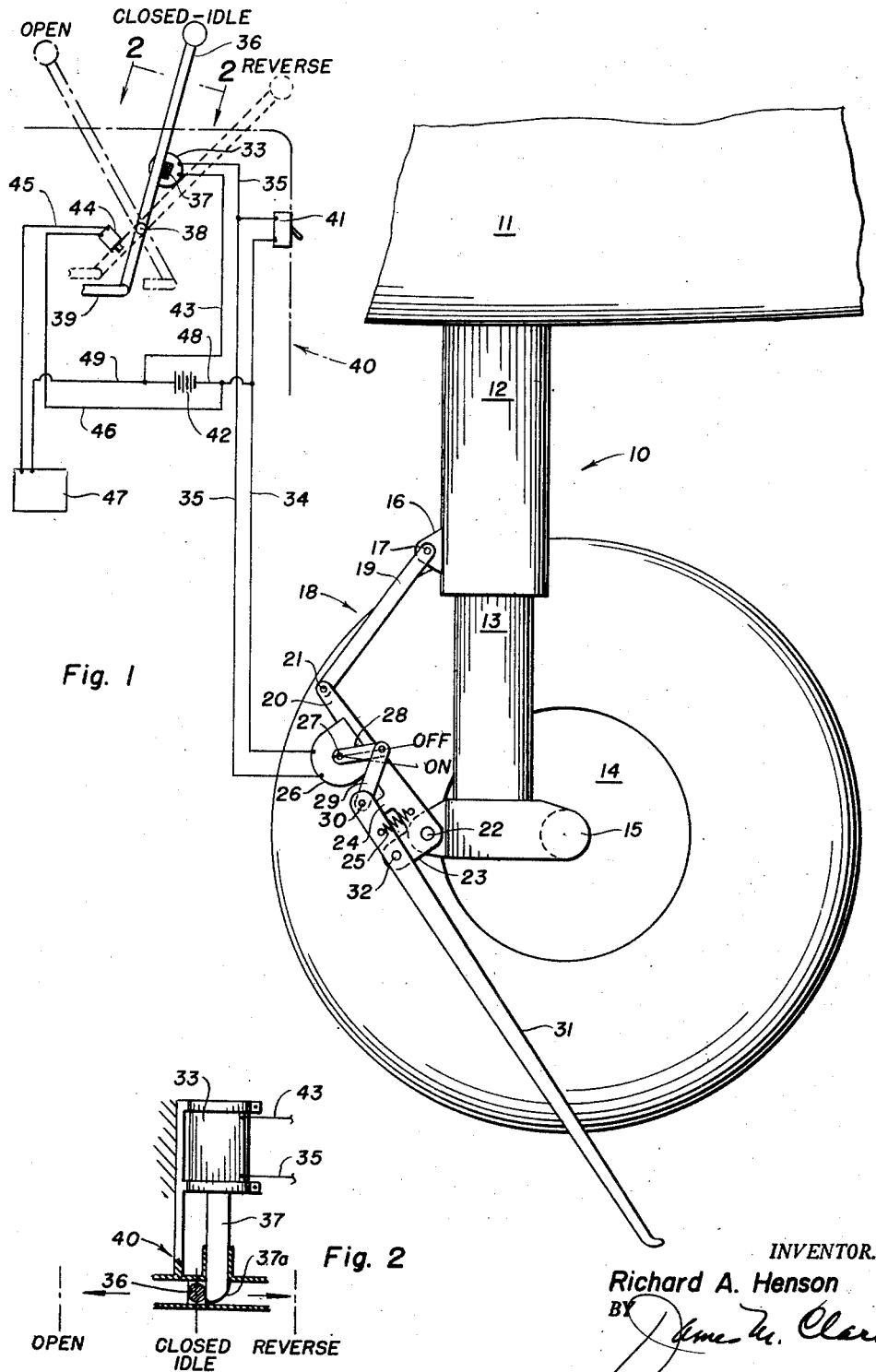

United States Patent Office 2,823,878
Patented Feb. 18, 1958

2,823,878

REVERSE THRUST LANDING CONTROL FOR AIRCRAFT

Richard A. Henson, Smithsburg, Md., assignor to Fairchild Engine and Airplane Corporation, a Maryland corporation Application March 11, 1955, Serial No. 493,658

9 Claims. (Cl. 244—81)

This invention relates to the landing of aircraft and more particularly to improved mechanisms for controlling the application of reverse thrust forces for retarding or braking the landing speed of aircraft.

As aircraft have become larger, heavier and faster, landing speeds have increased to such proportions that existing runways are frequently too short for safe operations. Many efforts have been made in the past to reduce and shorten the landing roll resulting from such high landing speeds and among these have been included arrangements for reversing the power plant thrust. In propeller driven aircraft, such reverse thrust has usually been accomplished by reversal of the pitch of the propeller blades. In such installations, it has been the customary practice to consolidate the propeller pitch control and the engine throttle control into a single manually operated lever control for each power plant such that when the control lever is moved to the proper position for thrust reversal the propeller pitch is reversed simultaneously as the speed of the engine is increased. In jet propelled aircraft such braking is usually accomplished by reversal or change in direction of the jet thrust.

While the provision of reverse thrust for shortening the landing roll of aircraft has proven to be of great advantage, certain potential hazards exist in connection with its use, such as the accidental or inadvertent application of reverse thrust while the aircraft is airborne. Several arrangements have been used heretofore to prevent such accidental use of reverse thrust, one of these utilized being an arrangement whereby the control lever in the cockpit is locked from being moved into the reverse thrust position until the aircraft has actually landed and is rolling on the runway. One such prior device provides an electrical circuit between the landing gear and the manual control lever in the cockpit wherein movement of the lever into the reverse thrust position is blocked until the landing gear shock strut is compressed to a predetermined amount under the load of the aircraft, at which time the lever blockage is removed. While such prior arrangements provide a necessary degree of safety to prevent application of reverse thrust before it can safely be applied, these arrangements do not utilize to the fullest extent, or as quickly as possible, the desired braking effects of reverse thrust on landing roll inasmuch as the airplane must roll a considerable distance after wheel touchdown before enough of the airborne weight has been transferred from the wings to the landing gear to compress the shock strut the required amount.

It is a major object of the present invention to provide improved mechanisms for the landing of aircraft and more particularly for the control of the application of reverse thrust forces during landings. It is a further object to provide improved reverse thrust control mechanism which not only provides the safety features of prior devices which prevent application of reverse thrust while an aircraft is airborne, but which also permits the application of such braking effects much sooner than heretofore in order to utilize to a greater extent the available length of airport runways. It is a further object to provide means whereby the braking effect of reverse thrust can be used to the maximum extent compatible with safety requirements by providing a ground contact element on the landing gear which will automatically remove the blockage from the reverse thrust control at the precise moment needed. A further object of this invention is the provision of a simple, automatic and foolproof mechanism which relieves the pilot of the additional task of accurately judging the height of the wheels above the ground in landing by the use of a probe device or feeler which automatically conditions the manual control for movement into the reverse thrust position as the wheels reach a predetermined distance from the ground in landing.

It is a still further object to provide a unique linkage arrangement whereby the probe device is automatically retracted from its ground contacting position as the wheels and the attached shock-absorbers become loaded by the weight of the aircraft. A further object resides in the provision of means associated with the improved mechanism whereby the pilot may override the effect of the probe device whenever he finds it desirable, and can also advance the throttle again with the accompanying propeller pitch adjustment, for forward thrust in the event he finds it desirable not to land, or after making a landing, desires to taxi to a particular position upon the ground.

Other objects and advantages of the present invention will become obvious to those skilled in the art following the reading of the accompanying description, taken in conjunction with the attached drawings, forming a part hereof, in which:

Fig. 1 is a side elevational view of the shock absorbing strut of a landing gear to which is preferred form of the present invention has been applied;

Fig. 2 is a sectional plan view of the throttle and pitch control lever with its associated solenoid-actuated blocking member as taken along the lines 2—2 of Fig. 1;

Fig. 3 is a side elevational view of the landing wheel and probe member with its associated mechanism in the position in which the probe has initially contacted the ground in landing; and Fig. 4 is a similar view of the same as may occur subsequently during the landing roll after the weight of the aircraft has been transferred from the wings to the landing wheels.

Referring now to Fig. 1, the numeral 11 indicates a portion of an aircraft, which may either be the fuselage or one of its wings, to which is attached, preferably such that it may be retracted during flight, the shock absorbing landing gear 10. This landing gear unit may preferably consist of a shock absorbing strut comprising the upper or cylinder member 12, and the lower or piston member 13 which is mounted for telescopic movement within the cylinder 12 to provide a shock absorber of a conventional type. The piston element 13 may have rotatably mounted thereon a suitable ground-engaging wheel 14 rotatably supported from the axle fitting 15. A lug 16 on the upper cylinder member 12 of the shock absorber strut assembly 10 supports, by means of the pivot 17, the upper link 19 of a nut-cracker or torque-scissors unit 18. Such nut-cracker linkages are frequently interconnected between the relatively telescopic elements of a shock absorber to prevent relative rotation of the piston element 13 with respect to the cylinder element 12 while at the same time permitting relative axial movement in accordance with shock absorbing requirements, insuring that the landing wheels, such as 14, are at all times positioned in the proper direction. The nut-cracker assembly 18 is composed of the usual two-part linkage 19 and 20 pivoted together at the intermediate pivot 21 with the lower link 20 pivoted to the axle fitting 15 at the pivot 22.

While the lower link 20 of the nut-cracker assembly may be the customary element normally found on the usual nut-cracker assembly to which the necessary parts of the improved mechanism may be suitably attached, there has been disclosed in the drawings a lower link 20 which is especially constructed to suit the requirements of the present invention by having an extension 23 formed at its lower terminal, as well as a projecting portion 24, serving as a limit stop, formed intermediate its two terminals and somewhat closer to the lower offset terminal 23. The link 20 is suitably apertured between the offset 23 and the stop 24 for the biasing tension spring 25. An electrical rotary type limit switch 26, which may preferably be of the type disclosed in U. S. Patent No. 2,468,974, issued to C. E. Hammer on May 3, 1949, for a Rotary Switch, is mounted upon the link 20 intermediate the terminals of the link but somewhat closer to its upper terminal pivoted at 21. The shaft 27 of the rotary switch 26 has attached thereto the arm 28 which is pivotally connected by means of the link 29, at the pivot 30, to the upper end of the substantially long and slender ground-engaging probe, feeler or stinger member 31, which will hereinafter be referred to as the probe member. The latter is pivoted at the point 32 on the extension 23 of the lower nut-cracker link 20, and is normally urged in a clockwise direction about its pivot 32 into a downwardly and rearwardly extending position with its upper portion against the stop member 24 by the biasing of the tension spring 25 interconnecting the probe member 31 with the lower link 20 intermediate the offset terminal portion 23 and the stop portion 24. The spring 25 thereby normally holds the probe 31 against the stop 24 and through the link 29 normally positions the switch 26 in the "off" position.

The rotary switch 26 is connected by means of the wires 34 and 35 with the solenoid 33 which actuates the barrier or blocking interponent element 37 for the control of the rearward movement of the throttle lever 36 into the reverse pitch position. A suitable source of electrical energy, which may be in the form of the battery 42, is connected into the circuit with the switch 26 and the solenoid 33 by means of the wires 43 and 48 in such manner that the barrier 37 is normally maintained in its blocking position as shown in Fig. 2. This is accomplished by the usual spring (not shown) in the solenoid 33 until such time as the solenoid is energized by the closing of the switch 26, at which time the solenoid overcomes the effect of its internal spring and the barrier 37 is retracted and withdrawn from the path of the lever 36. In order to override the automatic effect of the probe switch 26 and to permit the pilot to withdraw the barrier 37 whenever he sees fit to do so, he can also energize the solenoid 33 to withdraw the barrier 37 by manually closing the switch 41, which is connected in parallel across the solenoid and the battery with the switch 26 and, like the latter, is normally in the "off" or open position.

The general construction and operation of propeller-throttle controls are well known and have been substantially standarized with respect to their broad functions. As is well known, the customary arrangement for the throttle control of an aircraft engine in its simplest form provides a hand lever such as 36, for actuation by the pilot, which he moves in a forwardly direction, or to the left in Fig. 2, to the throttle "open" position to increase the speed of the engine; or alternatively, which he moves in a rearward direction to decrease the speed of the engine, the most rearward position of the forward range being the "closed" or the "idle" position, and the most forward position of the normal forward range being the "open" or full speed position. In aircraft equipped with reverse propeller-pitch control in conjunction with engine throttle control, the usual hand lever 36 is provided for the pilot, which he operates in a well known "forward-open," "rearward-closed" fashion. However, in addition to this, the throttle mechanism is so arranged that continuous movement rearwardly beyond the "closed" or "idle" position again begins to increase engine speed and at the same time reverses the pitch of the propeller blades. The throttle lever in effect, therefore, moves through an arc between two limits, the extremes of which are full speed engine positions, with an intermediate position which is the "closed" or "idle" position of the engine.

Without some means for positively indicating the "idle" or "closed" position to the pilot, an extremely hazardous condition would exist, as previously explained. Although several devices have been proposed and used, the usual arrangement in a simplified form provides a mechanical interference or barrier such as 37, associated with the throttle lever 36 to block its movement rearwardly beyond the "closed" or "idle" position during potentially hazardous periods, but which provides for removal of the barrier under non-hazardous periods when reverse thrust is either needed or desired, or is safe to apply. The barrier 37 which is sometimes referred to as a "gate," may be a metal pin or bar in its simplest form which is attached to a solenoid such as 33, and moves out of the path of the throttle lever when it is safe to move the throttle lever rearwardly into the reverse-thrust position. In certain prior arrangements, the solenoid is automatically actuated upon the closing of a switch on the landing gear as the shock absorber strut is compressed to a predetermined amount after the airplane has contacted the ground. Typical examples of such prior propeller reversing throttle arrangements are disclosed in the Giles et al. Patent No. 2,446,700, which issued August 10, 1948, and the Holt Patent No. 2,594,927, which issued April 29, 1952.

In the operation of the present invention, the probe 31 normally rests in the position of Fig. 1 during flight and while the landing gear is extended, in which the probe extends rearwardly and downwardly a predetermined distance below the bottom of the landing wheel 14. When the airplane lands, the free lower end of the probe 31 contacts the ground first as shown in Fig. 3. As the airplane settles, the probe is rotated counterclockwise about its pivot axis 32 such that the pivot point 30 swings downwardly to rotate the switch 26 to the closed or "on" position through the interconnecting linkages 28 and 29. The closing of the switch 26 completes the electric circuit to the solenoid 33 with the battery 42 to energize the solenoid 33 and thereby remove the barrier 37 from the path of the control lever 36, as previously described. The pilot is then able to move the control lever 36 into the reverse thrust position which shifts the propeller blades into reverse pitch through the contact switch 44 and the wiring 45 and 46 thereby energizing the propeller pitch actuator 47, and at the same time again applying power from the engine by increasing the throttle opening. The throttle lever 36, is pivoted at 38, within the housing or console 40, and has a lower extension portion which is pivotally connected by means of the linkage 39 to the engine throttle, and as the lower portion of the lever 36 approaches its propeller pitch reversing position it makes contact with the switch 44 to close the circuit with the electrical source 42, through the lines 45, 46 and 49, to power the propeller pitch actuating mechanism 47. In the case of a jet propelled aircraft, it will be understood that the mechanism 47 would be operatively connected to the jet reversal means or the equivalent mechanism.

There is a small interval of time between the initial contact of the probe 31 with the ground and initial contact of the wheel 14 with the ground, which time interval can be adjusted to substantially equal the time lag required for the propeller blades to move into reverse pitch and for the engine to come up to full power in order that the full braking effect of the reverse thrust can be brought into play at approximately the instant the wheels touch the ground. Adjustment of this time interval may be accomplished in any one of several ways, such as by selection of the proper length of either the probe 31 or the link 29, or by choosing the proper location of the switch 26 on the arm 20.

As the airplane continues its landing roll after contact with the ground, the shock strut piston 13 telescopes within the cylinder member 12 and closes or flattens the nut-cracker linkage 18. Inasmuch as the probe assembly 31 is attached to and moves with the lower link 20 of the nut-cracker assembly, the probe 31 is shifted counter-clockwise about the pivot 22 to a more horizontal position in which it is out of contact with the ground, as shown in Fig. 4. Ground operation, such as taxiing and the take-off run, therefore does not cause continuous wear on the end of the probe 31. It will be noted, however, that the switch 26 rotates back to the "off" position when the probe lifts for ground clearance and thereupon breaks the circuit holding the barrier 37 from the path of the control lever 36. The construction of the barrier, therefore, must allow the control lever to be moved freely in the forward direction while normally blocking it in the opposite or rearward direction and, in its simplest form, the barrier may be a plunger of the common spring-loaded door latch type with a beveled or cammed surface 37a on its reverse face to permit deflection by the lever 36 as it is moved forwardly from the reverse to the "closed" or "idle" position. Should it become necessary during ground operations to use reverse thrust, such as for backing into parking areas or making short radius turns, the barrier or latch may be manually moved by closing the switch 41 thereby energizing the solenoid and withdrawing the barrier from the path of the control lever 36.

While the present disclosure shows and describes a form of the present invention as applied to a propeller driven aircraft, by way of example, it is to be understood that the invention is equally applicable to the application of reverse jet thrust for braking purposes in jet propelled aircraft. In such aircraft, the landing speeds are frequently considerably higher than those of propeller driven aircraft and the need for suitable means which will permit the pilot to initiate the use of reverse thrust is even more important. A number of types of jet thrust reversal arrangements have been proposed and placed into use, and where the present invention is used with jet propelled aircraft, suitable blocking means corresponding to the barrier 37 might be interposed in the path of the control for actuating the jet thrust reversal means which could be similarly controlled by a limit switch corresponding to switch 44 and a jet reversal actuating mechanism such as the actuator 47 powered from a similar power source 42.

While the present invention has also been shown and described in conjunction with a single landing gear unit and a single engine control, it will also be understood that the invention is equally applicable to a plurality of landing gear units, as well as to the control of multiple engine aircraft. As indicated above, one of the principal features of this invention is the unique arrangement of the probe member associated with the nut-cracker linkage in such manner that it can initiate or permit the application of the thrust reversal means, whether propeller or jet type, at any predetermined distance of the wheel from the ground in its landing approach. It is therefore possible to install a probe on but one, or both of the main landing gear units, or on all of the units utilized for the landing and ground-operation of an aircraft. Where it is desired that the reverse thrust be applied, when one of the wheels of the aircraft reaches a predetermined distance from the ground the limit switches can be connected in parallel in order that closing of either one of a pair or set of switches can withdraw the barrier from the path of the control lever.

In other types of aircraft, it may be desirable that the two main wheels, or even all of the landing units of the aircraft, be within the prescribed distance from the ground in which case the switches could be connected in series with a suitable holding means included in the circuit in order to prevent its being re-opened by the compacting of one of the shock absorbing units. It may also be desirable in certain types of aircraft provided with nose or tail wheels to install the probe units and solenoid-actuating switch in either the nose wheel or the tail wheel depending upon the aircraft and the landing characteristics which are desired. While a preferred embodiment of this invention discloses the probe member mounted upon the lower link of a forwardly facing nutcracker assembly, it will be understood that it is also applicable to the upper link as well as to a rearwardly facing nut-cracker assembly. Whereas the preferred embodiment shown in the drawings and described herein utilizes rotative landing wheels, it will be understood that the invention can be applied with equal facility to other ground-engaging means such as skiis, skids, floats, and other types of landing devices.

Other forms and modifications of the present invention both with respect to its general arrangement and the details of its respective parts, are intended to come within the scope and spirit of this invention, as more particularly set forth in the appended claims.

I claim:

1. Mechanism for controlling an aircraft having a power plant, a reverse thrust means, and a landing gear having a nut-cracker linkage, said mechanism comprising a control lever operatively associated with said power plant and with said reverse thrust means for the manual control thereof, and means including a probe device operatively carried by the said nut-cracker linkage of said landing gear and normally extending beneath said landing gear for engagement with the ground, said mechanism adapted to prevent manual movement of said control lever for said reverse thrust means until said probe device engages the ground in landing, said probe device operatively carried upon said linkage in such manner that engagement of the landing gear with the ground initiates retraction of said probe device.

2. Mechanism for controlling an aircraft having a power plant, a reverse thrust means, and a landing gear having a nut-cracker linkage and a ground-engaging member, said mechanism comprising a control lever operatively associated with said power plant and with said reverse thrust means for the manual control thereof, and means including a probe device operatively carried by the said nut-cracker linkage of said landing gear and normally extending beneath said ground-engaging member adapted to prevent manual movement of said control lever for said reverse thrust means until said probe device engages the ground in landing, said probe device operatively associated with said linkage in such manner that engagement of the ground engaging member of the landing gear with the ground and concurrent movement of said nut-cracker linkage initiates retraction of said probe device.

3. Mechanism for controlling an aircraft having a power plant, a reverse thrust means, and a landing gear having a nut-cracker linkage and a ground-engaging member, said mechanism comprising a control lever operatively associated with said power plant and with said reverse thrust means for the manual control thereof, and means including a probe device operatively carried by the said nut-cracker linkage of said landing gear and normally extending beneath said ground-engaging member adapted to prevent manual movement of said control lever for said reverse thrust means until said probe device engages the ground in landing, said probe member operatively carried upon said nut-cracker linkage in such manner that engagement of said ground-engaging means with the ground in landing and folding of said nut-cracker linkage causes retraction of said probe member from its engagement with the ground.

4. In an aircraft having a power plant, a landing gear a reverse thrust means and a manually operated control lever operatively associated with said power plant and with said reverse thrust means, automatic control means for the blocking of said control lever to prevent the manual operation of said reverse thrust means under predetermined conditions of said landing gear, said automatic control means including a probe member operatively carried by said landing gear and having a portion extending therebeneath in the airborne position of the aircraft in which it effectively blocks the operation of said control lever for the manual operation of said reverse thrust means until said probe member is deflected upon making contact with the ground in the landing of the aircraft, said probe member operatively carried by said landing gear in such manner that engagement of the landing gear with the ground initiates retraction of said probe member.

5. Apparatus for controlling an aircraft having a power plant, a reverse thrust means associated with said power plant and a shock absorbing landing gear strut, said apparatus including a control lever operatively associated with said power plant and with said reverse thrust means, and means including a probe member operatively carried by the said aircraft landing gear extending beneath the aircraft in the unloaded condition of said landing gear, said means operatively connected to said control lever and adapted to prevent movement of said control lever for the control of said reverse thrust means until said probe member makes contact with the ground in the landing of the aircraft, said probe member operatively carried by said landing gear in such manner that loading of said landing gear initiates movement of said probe member to a retracted position with respect to said landing gear.

6. Apparatus for controlling an aircraft having a power plant, a reverse thrust means associated with said power plant and a shock absorbing landing gear strut having a nut-cracker linkage, said apparatus including a control lever operatively associated with said power plant and with said reverse thrust means, and means including a probe member operatively carried by the said nut-cracker linkage of said aircraft landing gear extending beneath the aircraft in the unloaded condition of said landing gear, said means operatively connected to said control lever and adapted to prevent movement of said control lever for the control of said reverse thrust means until said probe member makes contact with the ground in the landing of the aircraft, said probe member operatively carried by the said nut-cracker linkage of said landing gear in such manner that loading of said landing gear initiates movement of said probe member to a retracted position with respect to said landing gear such that said means is automatically conditioned for its projection upon subsequent unloading of the landing gear for like operation at the next landing of the aircraft.

7. Apparatus for controlling an aircraft having a power plant, a reverse thrust means associated with said power plant and a shock absorbing landing gear strut having a nut-cracker linkage and a wheel member, said apparatus including a control lever operatively associated with said power plant and with said reverse thrust means, and means including a probe member operatively carried by the said nut-cracker linkage of said aircraft landing gear extending beneath said wheel member in the unloaded condition of said landing gear, said means operatively connected to said control lever and adapted to prevent movement of said control lever for the control of said reverse thrust means until said probe member makes contact with the ground in the landing of the aircraft and before said wheel member makes contact with the ground, said probe member operatively carried by said nut-cracker linkage in such manner that engagement of said wheel member with the ground causes retraction of said probe member.

8. Apparatus for controlling the landing of an aircraft having a power plant, a reverse thrust means associated with said power plant, a shock absorbing landing gear strut, a landing wheel and a nut-cracker assembly having upper and lower links operatively associated with said landing gear strut, said apparatus including a control lever operatively associated with said power plant and with said reverse thrust means, solenoid-actuated blocking means adapted to be interposed in the path of said control lever, probe means operatively carried by one of the said links of the said nut-cracker assembly of said landing gear strut extending beneath the aircraft in the unloaded condition of said landing gear strut, said probe means operatively connected with said solenoid-actuated blocking means for said control lever and adapted to prevent movement of said control lever for the control of said reverse thrust means until said probe means makes contact with the ground in the landing of the aircraft, said probe means operatively carried by the said linkage of said nut-cracker assembly in such manner that engagement of said landing wheel with the ground causes retraction of said probe means.

9. Apparatus of the type called for by claim 8 characterized by the inclusion of switch means mounted upon one of said links of said nut-cracker assembly, said switch means in circuit with said solenoid-actuated blocking means, spring means biasing said probe means toward said nut-cracker linkage, and mechanism operatively connecting said switch means with said probe means, whereby initial contact of said probe member with the ground in landing of the aircraft prior to contact of said wheel and folding of said nut-cracker linkage causes operation of said switch means in a first direction and subsequent contact of said wheel with the ground and folding of said nut-cracker linkage imparts retracting movement of said probe member away from said ground contact and said biasing spring in cooperation with said probe member and said mechanism causes operation of said switch means in a reverse direction.

References Cited in the file of this patent

UNITED STATES PATENTS

| | | |
|---|---|---|
| 1,694,220 | Jenkins | Dec. 4, 1928 |
| 2,331,108 | De Ganahl | Oct. 5, 1943 |